(12) United States Patent
Fogwill

(10) Patent No.: US 11,624,734 B2
(45) Date of Patent: Apr. 11, 2023

(54) CHROMATOGRAPHIC DIMENSION SELECTION IN MULTIDIMENSIONAL LIQUID CHROMATOGRAPHY

(71) Applicant: Waters Technologies Corporation, Milford, MA (US)

(72) Inventor: Michael O. Fogwill, Uxbridge, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 0 days.

(21) Appl. No.: 17/360,131

(22) Filed: Jun. 28, 2021

(65) Prior Publication Data

US 2021/0404996 A1 Dec. 30, 2021

Related U.S. Application Data

(60) Provisional application No. 63/045,516, filed on Jun. 29, 2020.

(51) Int. Cl.
*G01N 30/72* (2006.01)
*G01N 30/20* (2006.01)
(Continued)

(52) U.S. Cl.
CPC .............. *G01N 30/20* (2013.01); *G01N 30/32* (2013.01); *G01N 30/7233* (2013.01);
(Continued)

(58) Field of Classification Search
CPC .... G01N 30/20; G01N 30/32; G01N 30/7233; G01N 30/74; G01N 2030/027; G01N 2030/202; G01N 2030/326; G01N 30/468
See application file for complete search history.

(56) References Cited

U.S. PATENT DOCUMENTS 6,537,432 B1  3/2003 Schneider et al.
6,677,114 B1  1/2004 Schneider et al.
(Continued)

OTHER PUBLICATIONS

International Search Report and Written Opinion in PCT/US2021/039337 dated Oct. 21, 2021.
(Continued)

*Primary Examiner* — David J Bolduc
(74) *Attorney, Agent, or Firm* — Schmeiser, Olsen & Watts LLP

(57) ABSTRACT

A system capable of performing both single and multidimensional liquid chromatography includes a solvent delivery system, a sample injection system, a first dimension column path configured to perform a separation process in a first dimension, a second dimension column path configured to perform a separation process in a second dimension that is different than the first dimension, a valve system; and a sample injection system fluidically connected to the valve system. The valve system is configured to direct flow from a sample injection system to a first dimension column path when the valve system is in a first position, and to direct flow from the sample injection system to the second dimension column path without the flow path flowing through the first dimension column path in the chromatography system when the valve system is in a second position.

18 Claims, 8 Drawing Sheets

(51) Int. Cl.
  *G01N 30/32* (2006.01)
  *G01N 30/74* (2006.01)
  *G01N 30/02* (2006.01)

(52) U.S. Cl.
  CPC ....... *G01N 30/74* (2013.01); *G01N 2030/027* (2013.01); *G01N 2030/202* (2013.01); *G01N 2030/326* (2013.01)

(56) References Cited

U.S. PATENT DOCUMENTS

| | | |
|---|---|---|
| 6,764,817 B1 | 7/2004 | Schneider |
| 6,818,112 B2 | 11/2004 | Schneider et al. |
| 6,849,396 B2 | 2/2005 | Schneider |
| 6,940,065 B2 | 9/2005 | Graber et al. |
| 7,211,376 B2 | 5/2007 | Schneider et al. |
| 7,435,406 B2 | 10/2008 | Schneider |
| 7,991,557 B2 | 8/2011 | Liew et al. |
| 8,003,076 B2 | 8/2011 | Schneider |
| 8,074,494 B2 | 12/2011 | Vorm et al. |
| 8,236,091 B2 | 8/2012 | Yang et al. |
| 8,455,202 B2 | 6/2013 | Regnier et al. |
| 8,618,477 B2 | 12/2013 | Krueger et al. |
| 8,621,915 B2 | 1/2014 | Liu |
| 9,091,695 B2 | 7/2015 | Grant et al. |
| 10,399,030 B2 | 9/2019 | Tipler |
| 2009/0145203 A1* | 6/2009 | Vorm .................... G01N 30/463 250/281 |
| 2010/0307334 A1* | 12/2010 | Yang .................... G01N 30/461 96/104 |
| 2011/0223683 A1* | 9/2011 | Regnier ............. G01N 33/6848 436/501 |
| 2012/0305761 A1* | 12/2012 | Krueger ............... G01N 27/622 250/288 |
| 2017/0010243 A1 | 1/2017 | Gaita et al. |
| 2017/0343520 A1 | 11/2017 | Ortmann et al. |
| 2018/0161718 A1* | 6/2018 | Tipler ................... G01N 30/72 |

OTHER PUBLICATIONS

International Preliminary Report on Patentability in International Application No. PCT/US2021/039337, dated Jan. 12, 2023.

* cited by examiner

CHROMATOGRAPHIC DIMENSION SELECTION IN MULTIDIMENSIONAL LIQUID CHROMATOGRAPHY

RELATED APPLICATIONS

This application claims the benefit of the earlier filing date of U.S. Provisional Patent Application Ser. No. 63/045,516, filed Jun. 29, 2020, and titled "Chromatographic Dimension Selection in Multidimensional Liquid Chromatography," the entirety of which is incorporated herein by reference.

FIELD OF THE INVENTION

The invention relates generally to liquid chromatography systems and more particularly, to systems and methods for performing multidimensional liquid chromatography.

BACKGROUND

Multidimensional liquid chromatography (MDLC) offers a powerful solution to the most challenging chemical separation problems. However, there are a series of limitations which prevent broad deployment and acceptance of this technology. For example, a system configured for MDLC is only able to perform MDLC and replumbing would be required to switch between MDLC and single dimensional separation.

Affinity selection mass spectrometry (automated ligand identification system) is one example of MDLC. Affinity selection mass spectrometry is a technique used to identify the most effective protein-binding candidate amongst a library of small molecules. It separates the bound small molecule-protein complex on a primary size exclusion dimension. The complex is heart-cut and modulated onto a secondary, denaturing reversed phase dimension where is bound small molecule is separated from the protein, then passed to a mass spectrometer for quantitation and identification.

Known systems for performing affinity selection mass spectrometry or other multidimensional processes are not known to be readily and easily reconfigurable to be able to perform single dimensional separation. Therefore, a new system capable of performing both single and multidimensional chromatography with ease of switching therebetween and having no replumbing required would be well received in the art.

SUMMARY

In one exemplary embodiment a system capable of performing both single and multidimensional liquid chromatography comprises: a solvent delivery system; a sample injection system; a first dimension column path configured to perform a separation process in a first dimension; a second dimension column path configured to perform a separation process in a second dimension; and a valve system; a sample injection system fluidically connected to the valve system. The valve system is configured to direct flow from a sample injection system to a first dimension column path when the valve system is in a first position. Further, the valve system is configured to direct flow from the sample injection system to the second dimension column path without the flow path flowing through the first dimension column path in the chromatography system when the valve system is in a second position.

Additionally or alternatively, the system includes a first detector located downstream from the first dimension column path, wherein the first detector is not a mass spectrometer; and a second detector located downstream from the second dimension column path, wherein the second detector is a mass spectrometer.

Additionally or alternatively, the solvent delivery system further includes: a first solvent delivery subsystem having a first pump, wherein the first solvent delivery subsystem is fluidically connected to a first valve of the valve system; and a second solvent delivery subsystem having a second pump, wherein the second solvent delivery subsystem is fluidically connected to a second valve of the valve system.

Additionally or alternatively, the valve system is configured direct flow from a sample injection system to a first dimension column path and store a portion of the flow in a storage loop, wherein the valve system is configured to further flow the portion of the flow through the second dimension column path.

Additionally or alternatively, the first valve is switchable from a first valve first position to a first valve second position, wherein in the first valve first position flow is directed from the first solvent delivery subsystem to the sample injection system, and wherein in the first valve second position flow is directed from the second solvent delivery subsystem to the sample injection system.

Additionally or alternatively, the system includes a sample storage loop fluidically connected to the second valve of the valve system.

Additionally or alternatively, the second valve is switchable from a second valve first position to a second valve second position, wherein in the second valve first position flow from the first solvent delivery subsystem is directed from the first detector to the sample storage loop and a path leading to a downstream waste, and wherein in the second valve second position fluid from the first solvent delivery subsystem is directed from the first detector directly to the path leading to the downstream waste while bypassing the sample storage loop.

Additionally or alternatively, in the second valve first position flow from the second solvent delivery subsystem is directed through the sample storage loop, to the first valve and to the second dimension column path, wherein in the second valve second position flow from the second solvent delivery subsystem is directed directly to the first valve and the second dimension column path while bypassing the sample storage loop.

Additionally or alternatively, the first dimension column path includes a size exclusion chromatography column, and wherein the second dimension column path includes a reversed phase liquid chromatography column.

In another exemplary embodiment, a method of dimensional selection for a chromatography system comprises: using a valve system of the chromatography system to direct flow from a sample injection system to a first dimension column path and into a second dimension column path, wherein the first dimension column path is configured to perform a first separation process in a first dimension, and wherein the second dimension column path is configured to perform a second separation process in a second dimension; and switching positions of the valve system to direct flow from the sample injection system to the second dimension column path without the flow path flowing through the first dimension column path in the chromatography system.

Additionally or alternatively, the chromatography system includes: a first detector located downstream from the first dimension column path, wherein the first detector is not a mass spectrometer; and a second detector located downstream from the second dimension column path, wherein the second detector is a mass spectrometer.

Additionally or alternatively, the valve system includes a first valve fluidically connected to a first solvent delivery subsystem, and wherein the valve system includes a second valve fluidically connected to a second solvent delivery subsystem, and the method further includes: switching the first valve from a first valve first position to a first valve second position, wherein in the first valve first position flow is directed from the first solvent delivery subsystem to the sample injection system, and wherein in the first valve second position flow is directed from the second solvent delivery subsystem to the sample injection system.

Additionally or alternatively, the method further includes switching the second valve from a second valve first position to a second valve second position, wherein in the second valve first position flow from the first solvent delivery subsystem is directed from a first detector to a sample storage loop and then to a path leading to a downstream waste, and wherein in the second valve second position fluid from the first solvent delivery subsystem is directed from the first detector directly to the path leading to the downstream waste while bypassing the sample storage loop.

Additionally or alternatively, the method further includes directing flow from the second solvent delivery subsystem through the sample storage loop to the first valve and to the second dimension column path when the second valve is in the second valve first position; and directing flow from the second solvent delivery subsystem directly to the first valve and the second dimension column path while bypassing the sample storage loop when the second valve is in the second valve second position.

In another exemplary embodiment, a valve system for a liquid chromatography system comprises: a first valve; and a second valve fluidically connected to the first valve. The first and second valves are configured direct flow from a sample injection system to a first dimension column path when the valve system is in a first position. Further, the first and second valves configured to direct flow from the sample injection system to the second dimension column path without the flow path flowing through the first dimension column path in the chromatography system when the valve system is in a second position.

Additionally or alternatively, the first valve is switchable from a first valve first position to a first valve second position, wherein in the first valve first position flow is configured to be directed from a first solvent delivery subsystem to the sample injection system, and wherein in the first valve second position flow is configured to be directed from a second solvent delivery subsystem to the sample injection system.

Additionally or alternatively, the valve system includes a sample storage loop fluidically connected to the second valve of the valve system.

Additionally or alternatively, the second valve is switchable from a second valve first position to a second valve second position, wherein in the second valve first position flow from the first solvent delivery subsystem is directed to the sample storage loop, and wherein in the second valve second position fluid from the first solvent delivery subsystem is directed from the first detector directly to the path leading to the downstream waste while bypassing the sample storage loop.

Additionally or alternatively, in the second valve first position flow from the second solvent delivery subsystem is directed through the sample storage loop, to the first valve and to the second dimension column path, wherein in the second valve second position flow from the second solvent delivery subsystem is directed directly to the first valve and the second dimension column path while bypassing the sample storage loop.

Additionally or alternatively, the valve system includes the sample injection system fluidically connected to the first valve.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Figure 1:
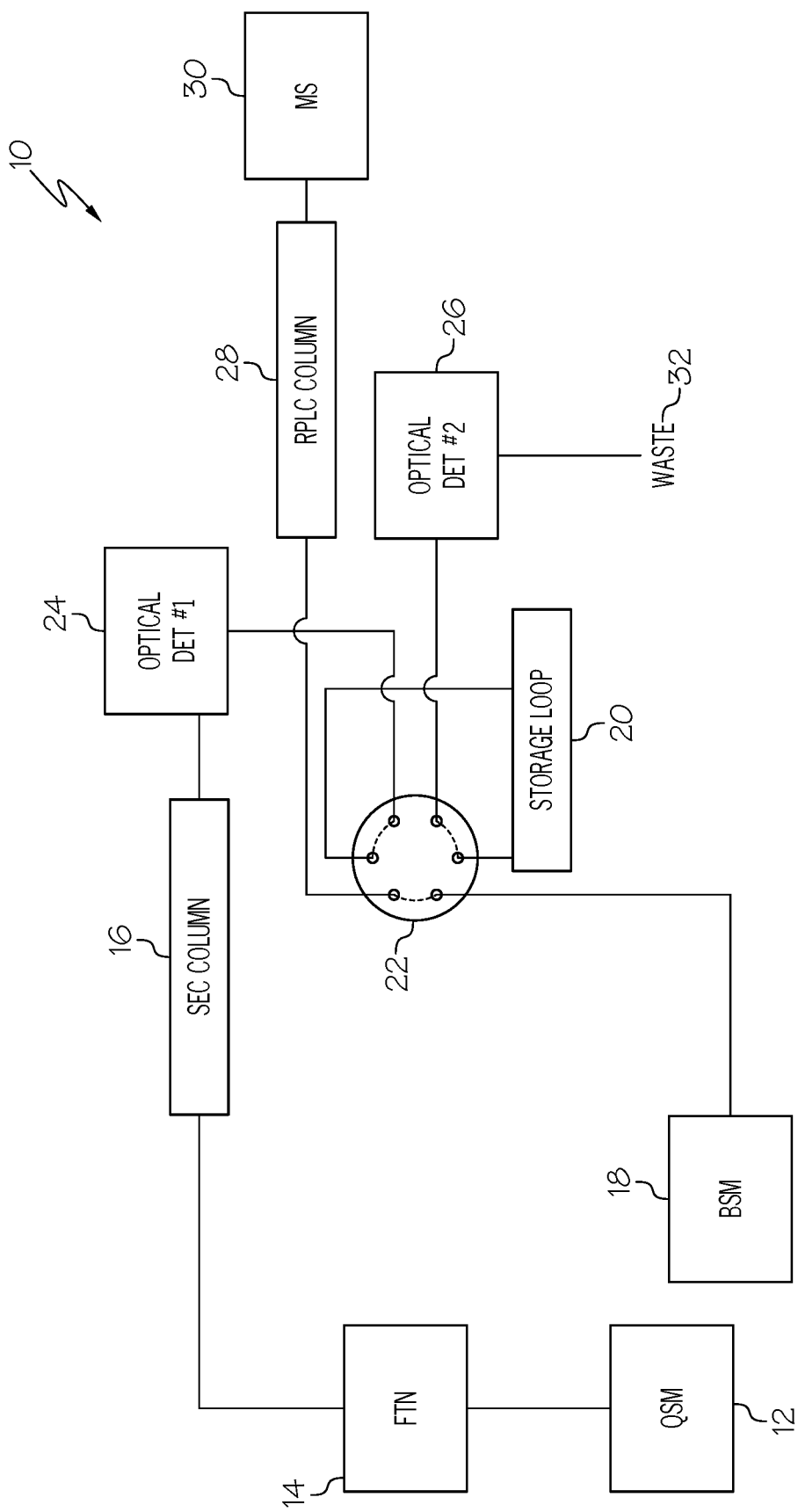
FIG. 1 depicts a prior art multidimensional liquid chromatography system.

Referring firstly to FIG. 1, a prior art multidimensional liquid chromatography system 10 is depicted schematically. The system 10 and includes a quaternary solvent manager (QSM) 12, a flow through needle (FTN) 14, a size exclusion chromatography (SEC) column 16, a binary solvent manager (BSM) 18, storage loop 20 coupled to a rotary shear valve 22, a first optical detector 24, a second optical detector 26, a reverse phase liquid chromatography (RPLC) column 28, and a mass spectrometer (MS) 30. The system further includes a waste pathway 32 downstream from the second optical detector 26.

In practice, fluid from the quaternary solvent manager (QSM) 12 receives an injection of a sample by the flow through needle (FTN) 14, after which the sample and solvent enters the size exclusion chromatograph (SEC) column 16 followed by the first optical detector 24. At first, the flow may flow through the rotary shear valve 22 and into the second optical detector 26 and then proceed to the waste pathway 32. Once the system, as detected by the first optical detector 24, determines that a particular cut of the flow is needed for a second dimension separation process, the rotary shear valve 22 is rotated such that flow from the first optical detector 24 flows through the storage loop 20. When the proper fluid is accumulated in the storage loop 20, the binary solvent manager 18 is activated, and pumps solvent through the rotary shear valve 22 and into the storage loop 20. At this point, the sample stored in the storage loop 20 will proceed through the rotary sear valve 22 and to the reverse phase liquid chromatography (RPLC) column for processing in a reverse phase dimension and finally to the mass spectrometer (MS) 30 for final detection in this dimension.

The above-described system is only operable for performing multidimensional liquid chromatography. Replumbing would be required in order to change the system 10 into a system configured for a single dimension separation process using the mass spectrometer.

Figure 2:
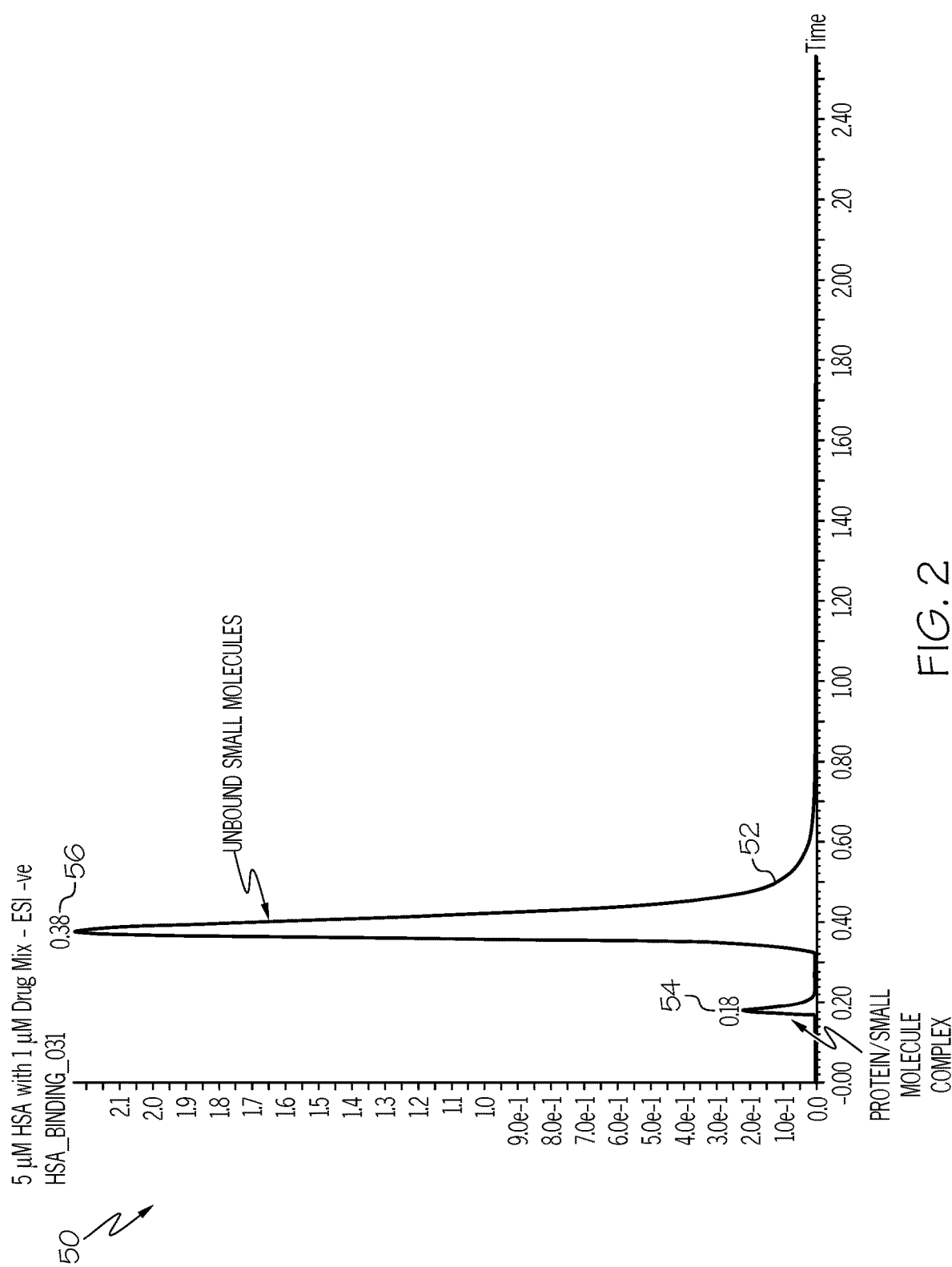
FIG. 2 depicts a graphical depiction of a separation process which separates small molecules bound to a protein, whereby the separated bound small molecules can be heart-cut and modulated onto a secondary dimension of separation, in accordance with one embodiment.

FIG. 2 depicts a graphical depiction 50 of a separation process which separates small molecules bound to a protein, whereby the separated bound small molecules can be heart-cut and modulated onto a secondary dimension of separation, in accordance with one embodiment. The system capable of performing both single and multidimensional liquid chromatography described hereinbelow may be configured to perform a separation on a sample resulting in this detected plot over time. The separation shown in the graphical depiction 50 may be a first separation occurring in a first dimension in a two-stage multidimensional separation process. In particular, the separation may be a size exclusion separation in the first dimension. The system capable of performing both single and multidimensional liquid chromatography may thereafter be configured to store the portion of the fluid embodied by the first small peak 54 in a storage loop. Once stored in the storage loop, the system capable of performing both single and multidimensional liquid chromatography may move the stored portion containing the first small peak 54 and move this portion through a second separation process in a second dimension, such as a separation process that is mass spectrometry compatible. As shown, the graphical depiction 50 includes a curve 52 plotting absorbance units over time. A second larger and taller peak 56 exists after the first peak 54. The first peak 54 may correspond to the protein and small molecule complex that will be subject to a second dimension of separation, while the second peak 56 may correspond to unbound small molecules in the sample.

Figure 3:
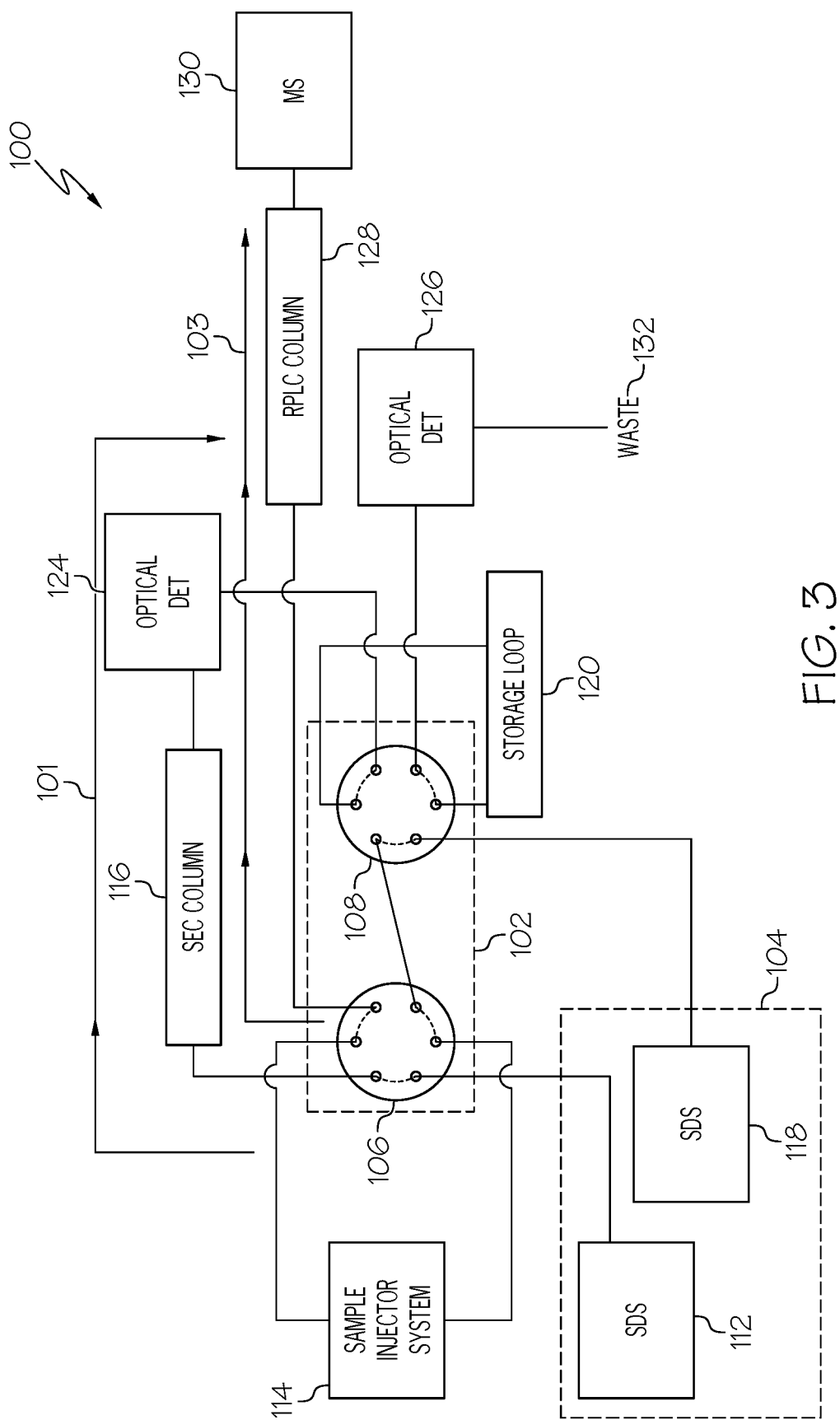
FIG. 3 depicts a system capable of performing both single and multidimensional liquid chromatography, in accordance with one embodiment.

FIG. 3 depicts a system 100 capable of performing both single and multidimensional liquid chromatography, in accordance with one embodiment. Unlike the system 10, the system 100 includes a valve system 102 that is configured to allow for the system to function as a single-dimensional separation or a MDLC system without re-plumbing or without altering the system fluidic structure. For example, the change between a single-dimensional separation to a MDLC system may be at the push of a button or the switching of a setting on a user interface or controller. The system 100 includes a solvent delivery system 104 that includes both a first solvent delivery subsystem 112 and a second solvent delivery subsystem 118. The system 100 further includes a sample injection system 114, a first dimension column such as a size exclusion chromatography (SEC) column 116, a storage loop 120 coupled to the valve system 102, a first optical detector 124, a second optical detector 126, a second dimension column such as reverse phase liquid chromatography (RPLC) column 128, and a mass spectrometer (MS) 130. The system further includes a waste pathway 132 downstream from the second optical detector 126. Still further, the valve system 102 includes both a first valve 106 and a second valve 108.

As shown, the valve system 102 is configured to direct flow from a sample injection system to a first dimension column path 101 when the valve system is in a first position, described in more detail herein below and shown in FIGS. 5-8. The first dimension column path 101 may be a fluidic pathway that provides a flow of fluid through a first column configured for separation in a first dimension, such as the SEC column 116 and an accompanying detector system, such as the optical detector 116. Moreover, the valve system 102 is configured to direct flow from the sample injection system to a second dimension column path 103 without the flow path flowing through the first dimension column path 101 in the system 100 when the valve system 102 is in a second position, again as described in more detail herein below and shown in FIGS. 5-8. The second dimension column path 103 may be a fluidic pathway that provides a flow of fluid through a second column configured for separation in a second dimension, such as the RPLC column 128 and an accompanying detector system, such as the mass spectrometer 130.

It should be understood that the embodiment shown in FIG. 3 is exemplary. For example, the solvent delivery system 104 is shown comprising two solvent delivery subsystems 112, 118. The solvent delivery subsystems 112, 118 may each include a pump. The pumps may be binary, quaternary, or isocratic pumps, for example. The pumps may be inclusive within a solvent manager system that is fluidically connected to solvent containers in order to pump solvent from the solvent containers to the downstream separation system. Moreover, there may be embodiments where the solvent delivery system 104 includes more or less than two subsystems shown.

Further, the sample injection system may be a sample manger system that includes various functionality, depending on the embodiment. The sample injection system may comprise a flow through needle or other injection system. Moreover, the sample injection system may include an operator system configured to load and unload samples therein for separation and may further store samples awaiting processing or having already been processed.

While the system 100 is shown including one SEC column 116, and one RPLC column 128, other types of columns are contemplated. The mobile phase flowing through the SEC column 116 may not be compatible with mass spectrometry, while the mobile phase flowing through the RPLC column 128 may be mass spectrometry compatible. Thus, the system 100 includes a first column that separates a sample for optical detection and not a mass spectrometer, while a second column separates the sample via the mass spectrometer 130. However, other embodiments are contemplated wherein the RPLC column 128 is replaced with any other type of column with a mobile phase that is mass spectrometer 130 compatible and the SEC column 116 is replaced with any other column with a mobile phase that is optical detection compatible. In other embodiments, the columns 116, 128 may not be configured for optical detection and mass spectrometry, respectively. In other words, the columns 116, 128 in combination may be configured for any multidimensional liquid chromatography application. The first column 116 may be any type of chromatography column configured to provide a separation in a first dimension, and the second column 128 may be any other type of chromatography column configured to provide a separation in a second dimension.

The embodiment shown further includes the storage loop 120. The storage loop may be any appropriate volume storage loop. For example, in contemplated embodiments, the storage loop may be 50 μL. In other applications, the storage loop may be larger or smaller than depending on, for example, the amount of sample volume in a heart-cut MDLC application. Moreover, the storage loop may be replaced by a trapping column or a combination of a storage loop and a trapping column arranged in series.

The embodiment shown includes two optical detectors 124, 126. The first optical detector 124 is shown directly downstream from the SEC column 116, while the second optical detector 126 is shown directly upstream from the waste pathway 132. Other embodiments may only include a second detector downstream from the SEC column 116, for example. The second detector 126 may be a failsafe or confirmation detector configured to confirm the accuracy of detection occurring at the first detector 124. In some embodiments, the detectors 124, 126 may be the same general type of optical detectors. In other embodiments, the detectors 124, 126 may have different properties. For example, one may be a tunable UV-Visible (TUV) absorbance detector, while the other may be a photodiode array (PDA) detector.

The mass spectrometer 130 downstream from the RPLC column 128 may be any type of known mass spectrometer, such as a single quadrupole mass detector, a tandem quadrupole or triple quadrupole mass detector, a time of flight mass spectrometer, an ion mobility mass spectrometer, an ion trap mass spectrometer, or the like. In still other embodiments, the second dimension column path 103 may be configured for a second dimension of separation which is not mass spectrometry compatible. Examples of dimensions of separation include a hydrophilic interaction LC (HILIC), a hydrophobic interaction chromatography (HIC), precipitation-redistribution liquid chromatography (PRLC), affinity enrichment chromatography (affinity chromatography), ion exchange chromatography, normal phase liquid chromatography, supercritical fluid chromatography (SFC) or the like.

The valve system 102 is shown including the two valves 106, 108. While the valves 106, 108 are each shown to be two position rotary shear valves which may be particularly advantageous in the application, other types of fluidic valve system capable of performing the functionality described herein may also be utilized. The rotary shear valves shown each include 6 ports for attaching to fluidic lines. One port for each of the two valves is utilized for a fluidic line connecting the two valves. The valve system 102 and in particular at least one of the two valves 106, 108, may be fluidically connectable directly to each of the solvent delivery system 104 (and subsystems 112, 118 thereof), the sample injection system 114, the columns 116, 128, the detectors 124, 126, and the storage loop 120.

Moreover, the valve system 120 may include a structural housing that includes fluidic ports for allowing the various fluidic pathways to connect to the valve system 120 in the schematic manner shown in FIGS. 3 and 5-8. Further, within the structural housing, the valve system 120 may include the storage loop 120. Still further, the valve system 120 may be an inclusive system which includes the functionality of the sample injection system 114 in some embodiments. Thus, the valve system 120 may be incorporated into a greater sample manager system that includes a sample injection system such as a flow through needle, along with the valves 106, 108, and the storage loop 120.

Figure 4:
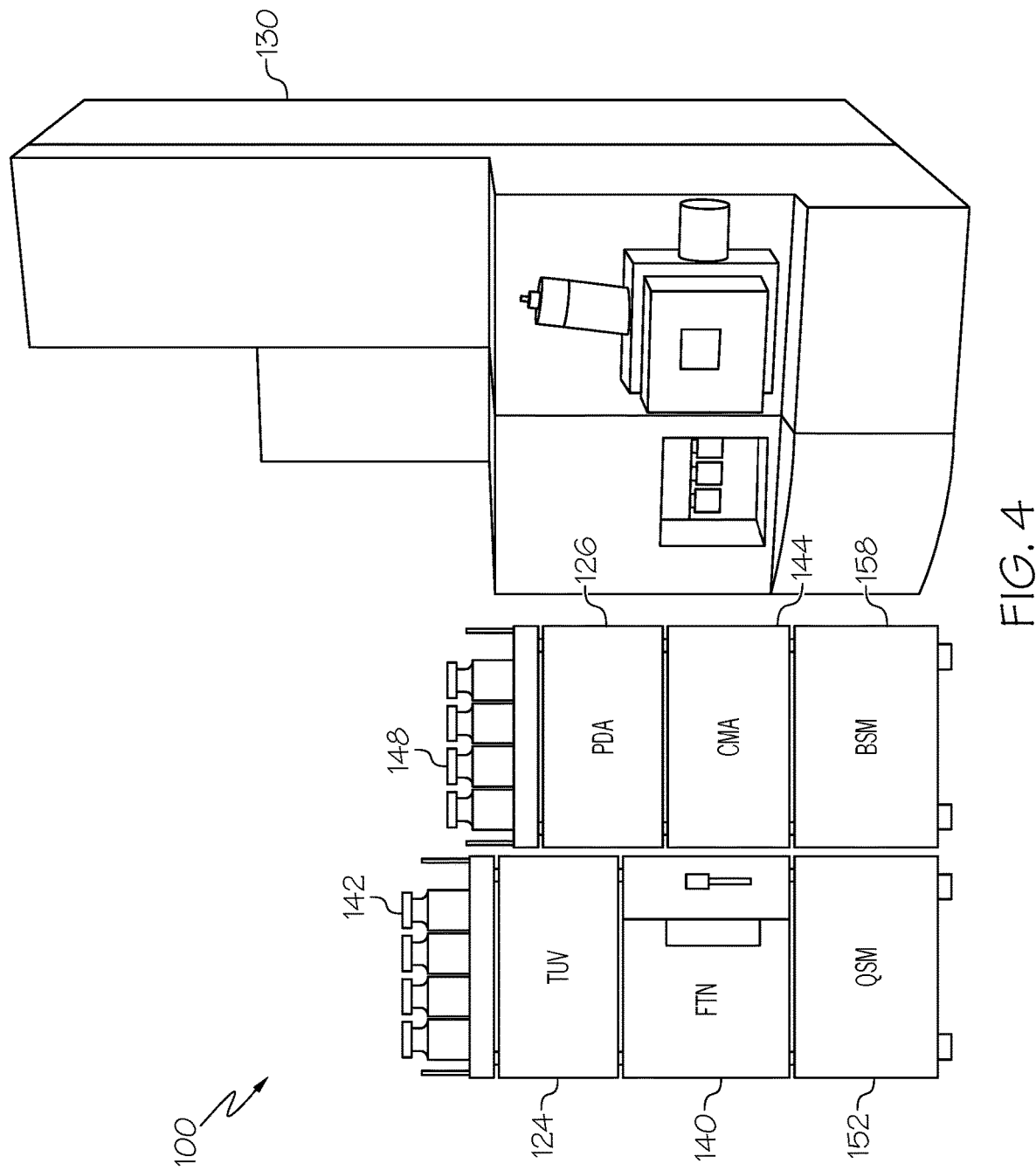
FIG. 4 depicts a perspective view of a system stacking configuration for the system of FIG. 3, in accordance with one embodiment.

FIG. 4 depicts a perspective view of a system stacking configuration for the system 100 of FIG. 3, in accordance with one embodiment. The stacking configuration includes the mass spectrometer 130 set next to a dual stacked system. The stacking configuration includes a first set of solvent bottles 142 and a second set of solvent bottles 148. The solvent bottles 142, 148 may be in fluidic communication with a first pump system 152 and a second pump system 158. A sample manager 140 includes the sample injection system 114. A column management system 144 includes the size exclusion chromatography (SEC) column 116 and the reverse phase liquid chromatography (RPLC) column 128 therein (not shown). The first optical detector 124 and the second optical detector 126 are also shown in the system stacking configuration. In one embodiment, the first optical detector 124 may be a tunable UV detector, while the second optical detector 126 may be a photodiode array (PDA) detector.

Figure 5:
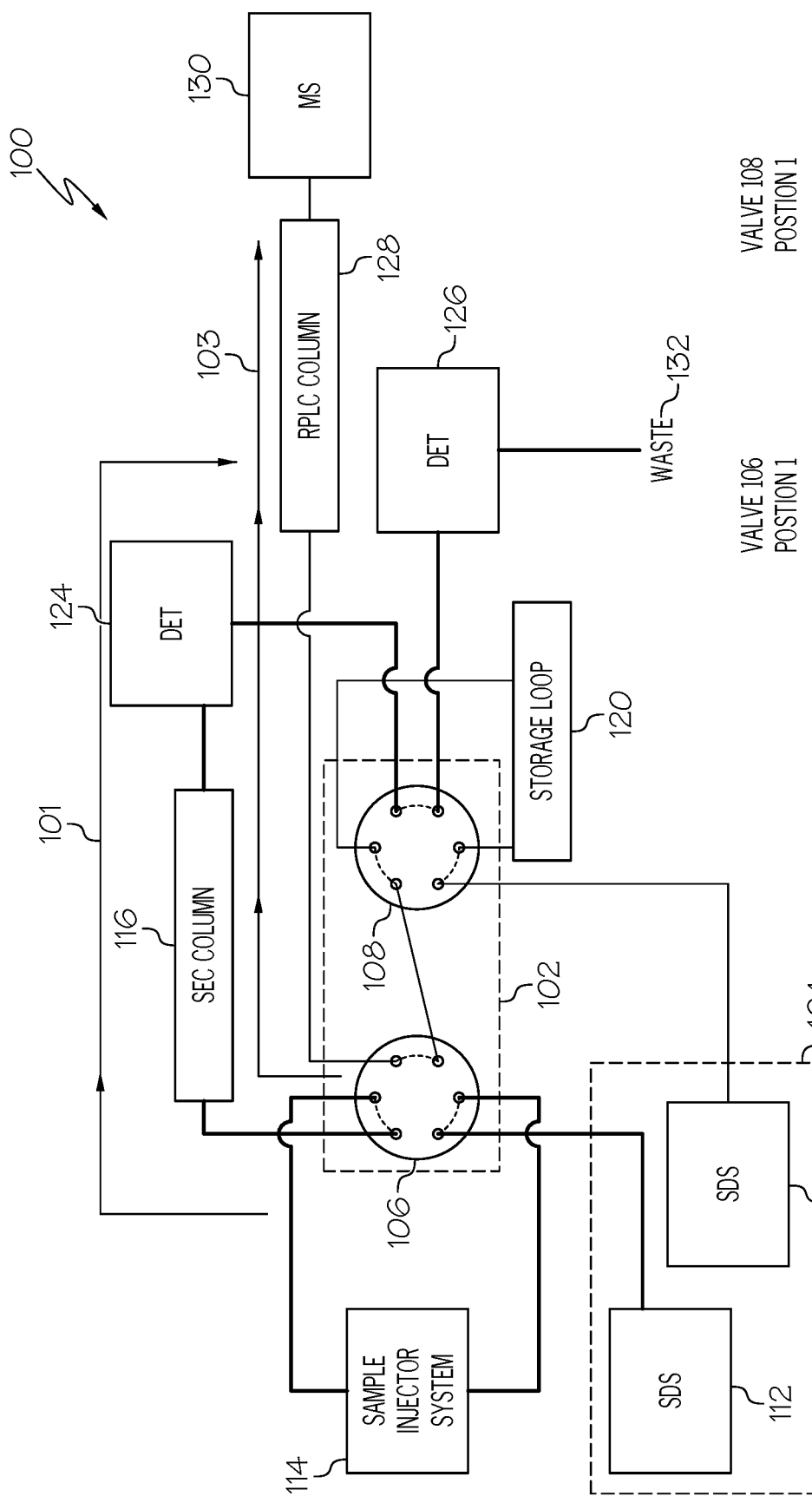
FIG. 5 depicts the system of FIG. 3 having a valve system in a first position and receiving a flow of fluid from a first solvent delivery subsystem, in accordance with one embodiment.

FIG. 5 depicts the system 100 of FIG. 3 having the valve system 102 in a first position and receiving a flow of fluid from the first solvent delivery subsystem 112, in accordance with one embodiment. As shown in this embodiment, the valve system 102 is in a first position whereby the first valve 106 is in position 1 and the second valve is in position 1. In this position, to start a multidimensional separation process, the first solvent delivery subsystem 112 is fluidically connected to the first valve 106 of the valve system 102 and provides flow (i.e. via a pump or pump system) to the first valve 106 from a solvent reservoir or bottle. The flow of solvent is directed through the sample injection system 114 whereby the sample is injected into the flow of solvent. The first valve 106 then directs the flow to the SEC column 116 and the first detector 124. Thereafter, the flow is flow through the second valve 108 which directs the flow to the second detector 126 and thereafter to a waste pathway 132.

Figure 6:
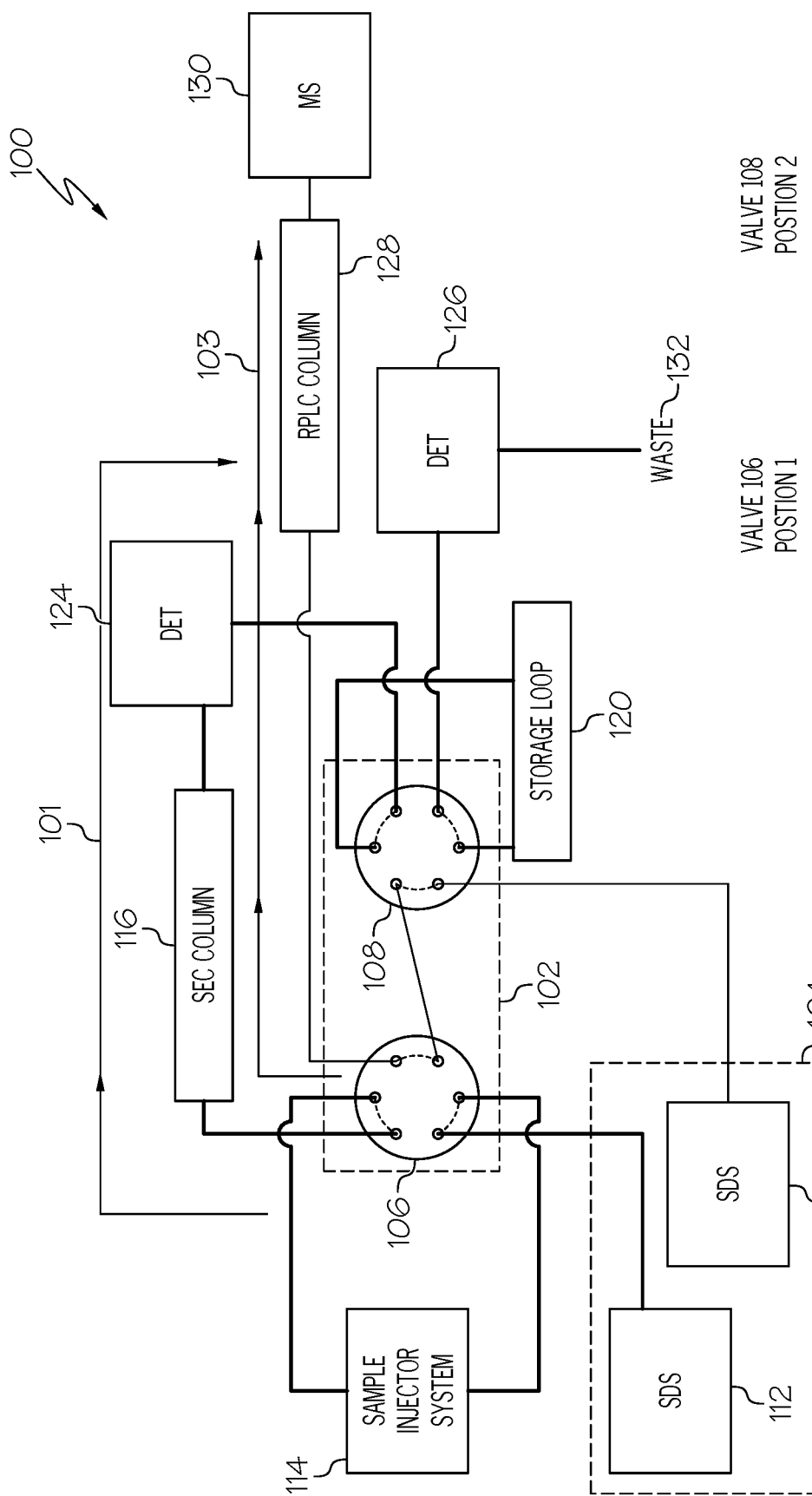
FIG. 6 depicts the system of FIG. 3 having a valve system in a second position and receiving a flow of fluid from the first solvent delivery subsystem, in accordance with one embodiment.

FIG. 6 depicts the system of FIG. 3 having the valve system 102 in a second position and receiving a flow of fluid from the first solvent delivery subsystem 112, in accordance with one embodiment. As shown in this embodiment, the valve system 102 is in a second position whereby the first valve 106 is in position 1 and the second valve is in position 2. In this position, relative to the position shown in FIG. 5, the second valve has been rotated to redirect flow through a storage loop 120 prior to flowing through the pathway to the second detector 124 and the waste pathway 132. Switching the valve system 102 from the first position (shown in FIG. 5) to the second position (shown in FIG. 6) may be considered the second step in a multidimensional separation process. This step may occur when a technician wants to perform a "heart cut" of a particular portion of a sample flow corresponding, for example, to the portion representing the first peak 54 shown in FIG. 2 and described hereinabove. This "heart cut" may be stored in the storage loop 120.

Figure 7:
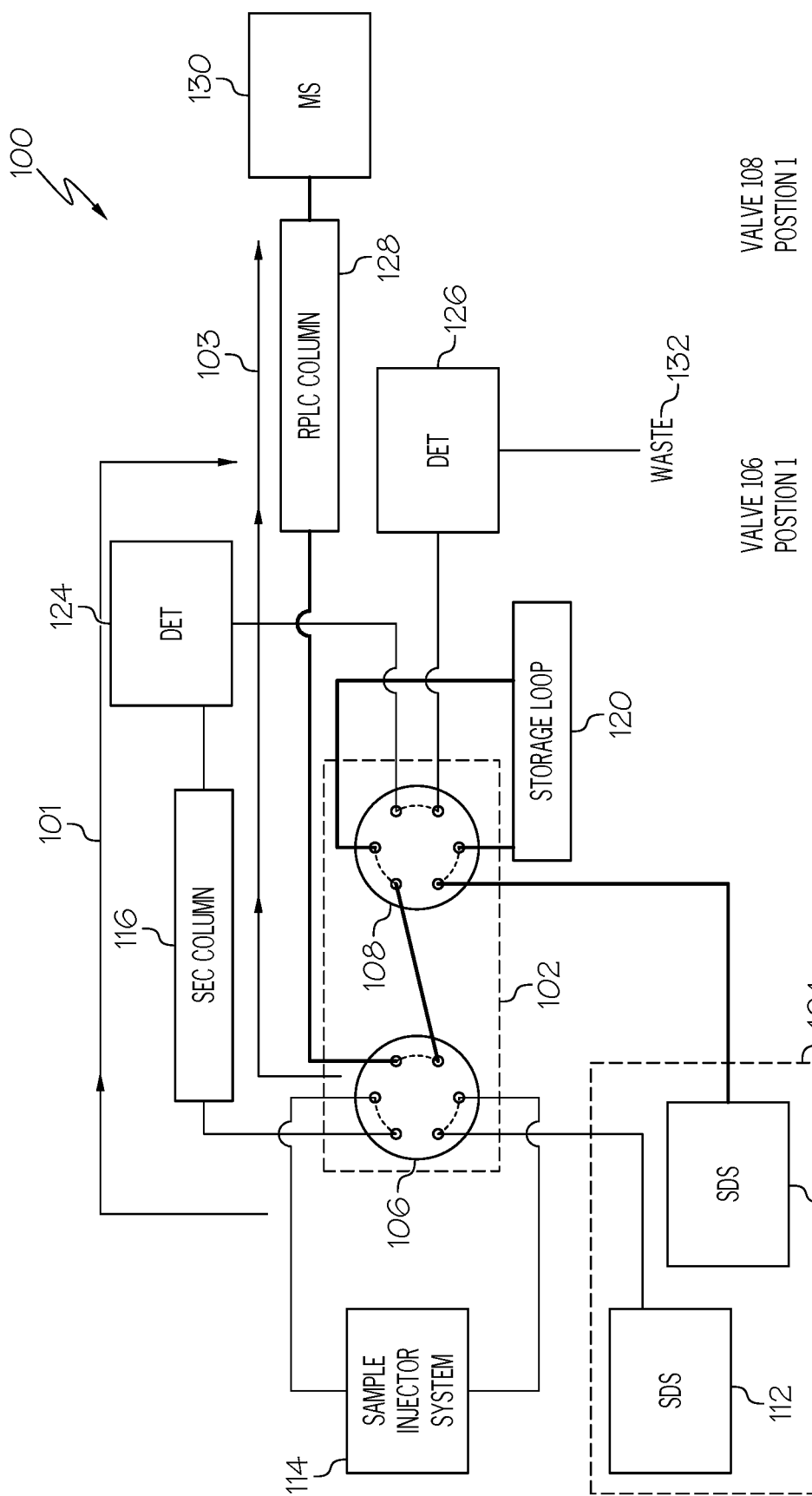
FIG. 7 depicts the system of FIG. 3 having a valve system in the first position and receiving a flow of fluid from a second solvent delivery subsystem, in accordance with one embodiment.

FIG. 7 depicts the system of FIG. 3 having the valve system switched back to the first position while receiving a flow of fluid from the second solvent delivery subsystem 118, in accordance with one embodiment. In this third step of a multidimensional separation process, the "heart cut" of the particular portion of the sample stored in the storage loop 120 is then directed, via the second solvent delivery subsystem 118, to the second dimension column path 103. In particular, the solvent from the second solvent delivery subsystem 118 is directed by a pump system, for example, through the second valve 108 to the storage loop 120. From the storage loop, the fluid, including the stored sample, flows back through the second valve 108, which redirects the fluid back to the first valve 106. From the first valve 106, the fluid is then directed to the second dimension column path 103, and in particular to the RPLC column 128. Once the separation occurs at the RPLC column 128, the fluid finally reaches the mass spectrometer 130 where it is detected in a second dimension. This flow of sample through each of the two column paths completes the MDLC separation process.

Figure 8:
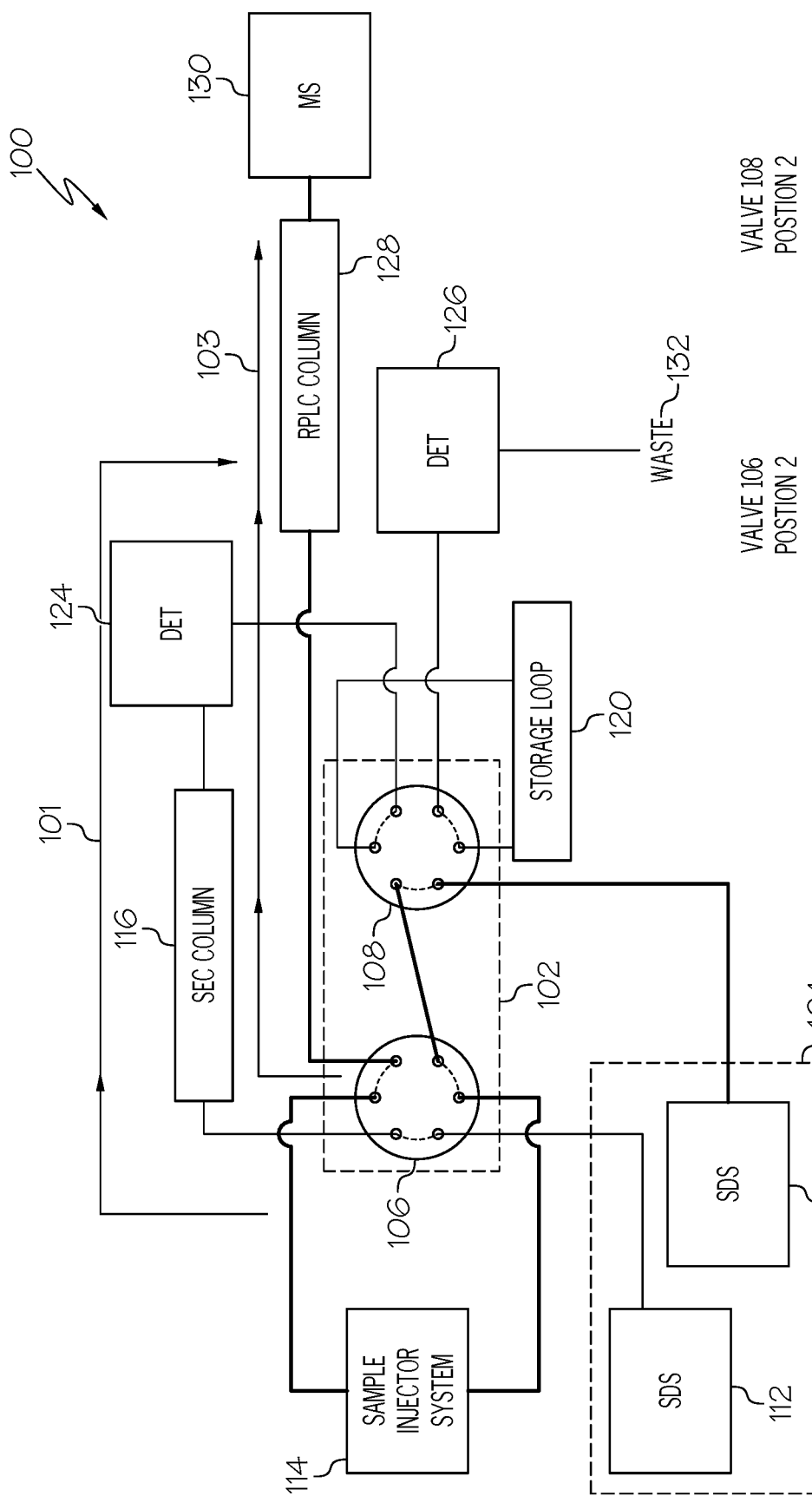
FIG. 8 depicts the system of FIG. 3 having a valve system in a third position and receiving flow of fluid from the second solvent delivery subsystem, in accordance with one embodiment.

FIG. 8 depicts the system of FIG. 3 having the valve system 102 in a third position and receiving flow of fluid from the second solvent delivery system 118, in accordance with one embodiment. In this embodiment, a single dimension separation and detection process of a new sample can be performed without replumbing that utilizes both the sample injection system 114 and the mass spectrometer 130 and RPLC column 128. Here, the second solvent delivery subsystem 118 that is fluidically connected to the second valve 108 of the valve system 102 provides flow (i.e. via a pump or pump system) to the second valve 108 from a solvent reservoir or bottle. The flow of solvent is then directed from the second valve 108 to the first valve 106 and then the flow of solvent is directed through the sample injection system 114 whereby the sample is injected into the flow of solvent. The first valve 106 then directs the flow to the RPLC column 128 and the mass spectrometer 130.

Switching between the valve positions in the above-described manner may be performable by an operator simply pressing a button on a user interface or other control mechanism. Thus, the system 100 may include a control system, processor, display or the like, for allowing an operator to control the valve system 102 with the switch or pressing of a button or the changing of a simple setting which redirects the valves 106, 108 of the valve system 102. Using the above-described structure, no replumbing is required when switching between an MDLC system, utilizing both the SEC column 116 separation and the RPLC column 128 and the mass spectrometer 130 separation, and a single dimensional separation process utilizing only the RPLC column 128 and the mass spectrometer 130.

Thus, as described above, the valve system 102 is configured direct flow from the sample injection system 114 to the first dimension column path 101 and thereafter store a portion of the flow in a storage loop 120 (e.g. a "heart cut" portion). Moreover, the valve system 102 is configured to further flow the portion of the flow through the second dimension column path 103. The first valve 106 of the valve system 102 is switchable from a first valve first position (e.g. shown in FIGS. 5-7) to a first valve second position (shown in FIG. 8). In the first valve first position, flow is directed from the first solvent delivery subsystem 112 to the sample injection system 114. In the first valve second position, flow is directed from the second solvent delivery subsystem 118 to the sample injection system 114.

Moreover, in embodiments described herein, the second valve 108 is switchable from a second valve first position (e.g. shown in FIGS. 5 and 7) to a second valve second position (e.g. shown in FIGS. 6 and 8). In the second valve first position, flow from the first solvent delivery subsystem 112 is directed from the first detector 124 to the sample storage loop 120 and a path leading to the downstream waste 132. In the second valve second position, fluid from the first solvent delivery subsystem 112 is directed from the first detector 124 directly to the path leading to the downstream waste 132 while bypassing the sample storage loop 120. Moreover, in the second valve first position, flow from the second solvent delivery subsystem 118 is directed through the sample storage loop 120, to the first valve 106 and to the second dimension column path 103. In the second valve second position, flow from the second solvent delivery subsystem 118 is directed directly to the first valve 106 and the second dimension column path 103 while bypassing the sample storage loop 120.

Switching can be achieved by using a valve to fluidically re-route the sample introduction from the head of the primary dimension column to the head of the second-dimension column. The first valve 106 is responsible for fluidically rerouting the sample introduction from the first dimension to the second dimension. The first valve 106 can be configured to inject onto the SEC column 116 or, alternatively, can inject onto the RPLC column 128 using the solvent flow from the second solvent delivery subsystem 118.

The tubing for the system of FIGS. 3-8 may be made from a range of materials including MP35N alloy, stainless steel, fused silica, and PEEK and may have inner diameters from 10 to 1000 μm. Active preheaters (not shown) can be included in the paths leading to the two columns.

Thus, as described above, methods of dimensional selection for chromatography systems are contemplated herein. In particular, methods contemplated herein include using a valve system, such as the valve system 102, of a chromatography system, such as the chromatography system 100, to direct flow from a sample injection system, such as the sample injection system 114, to a first dimension column path, such as the first dimension column path 101, into a second dimension column path, such as the second dimension column path 103, where the first dimension column path is configured to perform a first separation process in a first dimension, and where the second dimension column path is configured to perform a second separation process in a second dimension. Methods may further include switching positions of the valve system to direct flow from the sample injection system to the second dimension column path without the flow path flowing through the first dimension column path in the chromatography system.

In methods contemplated herein, a first detector, such as the first detector 124, is located downstream from the first dimension column path, where the first detector is not a mass spectrometer. Similarly, in methods contemplated herein, a second detector, such as the mass spectrometer 130, is located downstream from the second dimension column path, where the second detector is a mass spectrometer.

In still other embodiments, the valve system includes a first valve, such as the first valve 106, fluidically connected to a first solvent delivery subsystem, such as the first solvent delivery subsystem 112, and the valve system includes a second valve, such as the second valve 108 fluidically connected to a second solvent delivery subsystem, such as the second solvent delivery subsystem 118. Methods contemplated may further include switching the first valve from a first valve first position (e.g. as shown in FIGS. 5-7) to a first valve second position (e.g. as shown in FIG. 8), where in the first valve first position flow is directed from the first solvent delivery subsystem to the sample injection system, and where in the first valve second position flow is directed from the second solvent delivery subsystem to the sample injection system.

In still other embodiments, methods contemplated include switching the second valve from a second valve first position (e.g. as shown in FIGS. 5 and 7) to a second valve second position (e.g. as shown in FIGS. 6 and 8), where in the second valve first position flow from the first solvent delivery subsystem is directed from a first detector to a sample storage loop, such as the sample storage loop 120, and then to a path leading to a downstream waste such as the waste pathway 132, and where in the second valve second position fluid from the first solvent delivery subsystem is directed from the first detector directly to the path leading to the downstream waste while bypassing the sample storage loop.

Moreover, methods contemplated include directing flow from the second solvent delivery subsystem through the sample storage loop to the first valve and to the second dimension column path when the second valve is in the second valve first position. Methods further include directing flow from the second solvent delivery subsystem directly to the first valve and the second dimension column path while bypassing the sample storage loop when the second valve is in the second valve second position.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system capable of performing both single and multidimensional liquid chromatography comprising:
   a solvent delivery system;
   a first dimension column path configured to perform a separation process in a first dimension;
   a second dimension column path configured to perform a separation process in a second dimension;
   a valve system; and
   a sample injection system fluidically connected to the valve system,
   wherein the valve system is configured to direct flow from the sample injection system to the first dimension column path when the valve system is in a first position, wherein the valve system is configured to direct flow from the sample injection system to the second dimension column path without the flow path flowing through the first dimension column path in the chromatography system when the valve system is in a second position, and
   wherein the solvent delivery system further includes:
      a first solvent delivery subsystem having a first pump, wherein the first solvent delivery subsystem is directly fluidically connected to a first valve of the valve system; and
      a second solvent delivery subsystem having a second pump, wherein the second solvent delivery subsystem is directly fluidically connected to a second valve of the valve system.

2. The system of claim 1, further comprising:
   a first detector located downstream from the first dimension column path, wherein the first detector is not a mass spectrometer; and
   a second detector located downstream from the second dimension column path, wherein the second detector is a mass spectrometer.

3. The system of claim 2, wherein the valve system is configured to direct flow from the sample injection system to the first dimension column path and store a portion of the flow in a storage loop, wherein the valve system is configured to further flow the portion of the flow through the second dimension column path.

4. The system of claim 3, wherein the first valve is switchable from a first valve first position to a first valve second position, wherein in the first valve first position flow is directed from the first solvent delivery subsystem to the sample injection system, and wherein in the first valve second position flow is directed from the second solvent delivery subsystem to the sample injection system.

5. The system of claim 2, further comprising a sample storage loop fluidically connected to the second valve of the valve system.

6. The system of claim 5, wherein the second valve is switchable from a second valve first position to a second valve second position, wherein in the second valve first position flow from the first solvent delivery subsystem is directed from the first detector to the sample storage loop and a path leading to a downstream waste, and wherein in the second valve second position fluid from the first solvent delivery subsystem is directed from the first detector directly to the path leading to the downstream waste while bypassing the sample storage loop.

7. The system of claim 6, wherein in the second valve first position flow from the second solvent delivery subsystem is directed through the sample storage loop, to the first valve and to the second dimension column path, wherein in the second valve second position flow from the second solvent delivery subsystem is directed directly to the first valve and the second dimension column path while bypassing the sample storage loop.

8. The system of claim 2, wherein the first dimension column path includes a size exclusion chromatography column, and wherein the second dimension column path includes a reversed phase liquid chromatography column.

9. A method of dimensional selection for a chromatography system comprising:
   using a valve system of the chromatography system to direct flow from a sample injection system to a first dimension column path and into a second dimension column path, wherein the first dimension column path is configured to perform a first separation process in a first dimension, and wherein the second dimension column path is configured to perform a second separation process in a second dimension; and switching positions of the valve system to direct flow from the sample injection system to the second dimension column path without the flow path flowing through the first dimension column path in the chromatography system, wherein the valve system includes a first valve directly fluidically connected to a first solvent delivery subsystem, and wherein the valve system includes a second valve directly fluidically connected to a second solvent delivery subsystem.

10. The method of claim 9, wherein the chromatography system includes:
a first detector located downstream from the first dimension column path, wherein the first detector is not a mass spectrometer; and
a second detector located downstream from the second dimension column path, wherein the second detector is a mass spectrometer.

11. The method of claim 9, further comprising:
switching the first valve from a first valve first position to a first valve second position, wherein in the first valve first position flow is directed from the first solvent delivery subsystem to the sample injection system, and wherein in the first valve second position flow is directed from the second solvent delivery subsystem to the sample injection system.

12. The method of claim 11, further comprising:
switching the second valve from a second valve first position to a second valve second position, wherein in the second valve first position flow from the first solvent delivery subsystem is directed from a first detector to a sample storage loop and then to a path leading to a downstream waste, and wherein in the second valve second position fluid from the first solvent delivery subsystem is directed from the first detector directly to the path leading to the downstream waste while bypassing the sample storage loop.

13. The method of claim 12, further comprising:
directing flow from the second solvent delivery subsystem through the sample storage loop to the first valve and to the second dimension column path when the second valve is in the second valve first position; and
directing flow from the second solvent delivery subsystem directly to the first valve and the second dimension column path while bypassing the sample storage loop when the second valve is in the second valve second position.

14. A valve system for a liquid chromatography system comprising:
a first valve; and
a second valve fluidically connected to the first valve;
wherein the first and second valves are configured to direct flow from a sample injection system to a first dimension column path when the valve system is in a first position, and
wherein the first and second valves configured to direct flow from the sample injection system to a second dimension column path without the flow path flowing through the first dimension column path in the chromatography system when the valve system is in a second position,
wherein the first valve is switchable from a first valve first position to a first valve second position, wherein in the first valve first position flow is configured to be directed from a first solvent delivery subsystem to the sample injection system when the first valve is directly fluidically connected to the first solvent delivery subsystem, and wherein in the first valve second position flow is configured to be directed from a second solvent delivery subsystem to the sample injection system when the second valve is fluidically connected to the second solvent delivery subsystem.

15. The valve system of claim 14, further comprising a sample storage loop fluidically connected to the second valve of the valve system.

16. The valve system of claim 15, wherein the second valve is switchable from a second valve first position to a second valve second position, wherein in the second valve first position flow from the first solvent delivery subsystem is directed to the sample storage loop, and wherein in the second valve second position fluid from the first solvent delivery subsystem is directed from a first detector directly to a path leading to a downstream waste while bypassing the sample storage loop.

17. The valve system of claim 16, wherein in the second valve first position flow from the second solvent delivery subsystem is directed through the sample storage loop, to the first valve and to the second dimension column path, wherein in the second valve second position flow from the second solvent delivery subsystem is directed directly to the first valve and the second dimension column path while bypassing the sample storage loop.

18. The valve system of claim 14, further comprising the sample injection system fluidically connected to the first valve.

* * * * *